(12) United States Patent
Shankarappa et al.

(10) Patent No.: US 10,375,170 B2
(45) Date of Patent: Aug. 6, 2019

(54) LOW DOWNTIME SOFTWARE-DEFINED WIDE AREA NETWORK SERVICE UPGRADE

(71) Applicant: VMware, Inc., Palo Alto, CA (US)

(72) Inventors: Narendra Kumar Basur Shankarappa, Sunnyvale, CA (US); Aravind Srinivasan, Santa Clara, CA (US); Sachin Thakkar, San Jose, CA (US); Serge Maskalik, Los Gatos, CA (US); Govind Haridas, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 134 days.

(21) Appl. No.: 15/690,230

(22) Filed: Aug. 29, 2017

(65) Prior Publication Data

US 2018/0063074 A1 Mar. 1, 2018

Related U.S. Application Data

(60) Provisional application No. 62/380,993, filed on Aug. 29, 2016.

(51) Int. Cl.
*G06F 15/177* (2006.01)
*H04L 29/08* (2006.01)
(Continued)

(52) U.S. Cl.
CPC ............ *H04L 67/1097* (2013.01); *G06F 8/65* (2013.01); *G06F 9/5027* (2013.01);
(Continued)

(58) Field of Classification Search
CPC . H04L 67/1097; H04L 67/10; H04L 61/2007; H04L 61/2592; H04L 63/0272; H04L 63/029; H04L 49/354; H04L 49/70; H04L 47/825; H04L 45/72; H04L 41/0803; H04L 12/4633
(Continued)

(56) References Cited

U.S. PATENT DOCUMENTS

2003/0088421 A1 5/2003 Maes et al.
2003/0191834 A1 10/2003 Steegmans
(Continued)

*Primary Examiner* — Philip B Tran
(74) *Attorney, Agent, or Firm* — Patterson + Sheridan, LLP

(57) ABSTRACT

Techniques for upgrading virtual appliances in a hybrid cloud computing system are provided. In one embodiment, virtual appliances are upgraded by deploying the upgraded appliances in both a data center and a cloud, configuring the upgraded appliances to have the same IP addresses as original appliances, and disconnecting the original appliances from networks to which they are connected and connecting the upgraded appliances to those networks via the same ports previously used by the original appliances. In another embodiment, upgraded appliances are deployed in the data center and the cloud, but configured with new IP addresses that are different from those of the original appliances, and connections are switched from those of the original appliances to new connections with the new IP addresses. Embodiments disclosed herein permit virtual appliances to be upgraded or replaced with relatively little downtime so as to help minimize disruptions to existing traffic flows.

20 Claims, 6 Drawing Sheets

(51) Int. Cl.
*H04L 29/12* (2006.01)
*H04L 12/721* (2013.01)
*H04L 12/801* (2013.01)
*H04L 12/911* (2013.01)
*H04W 28/02* (2009.01)
*G06F 9/50* (2006.01)
*H04L 12/24* (2006.01)
*H04L 12/931* (2013.01)
*H04L 12/46* (2006.01)
*H04L 29/06* (2006.01)
*G06F 8/65* (2018.01)
*H04L 12/715* (2013.01)
*H04L 12/725* (2013.01)
*G06F 9/455* (2018.01)

(52) U.S. Cl.
CPC ........ *G06F 9/5061* (2013.01); *H04L 12/4633* (2013.01); *H04L 41/082* (2013.01); *H04L 41/0803* (2013.01); *H04L 45/72* (2013.01); *H04L 47/12* (2013.01); *H04L 47/825* (2013.01); *H04L 49/354* (2013.01); *H04L 49/70* (2013.01); *H04L 61/2007* (2013.01); *H04L 61/2592* (2013.01); *H04L 63/029* (2013.01); *H04L 63/0272* (2013.01); *H04W 28/0273* (2013.01); *H04W 28/0289* (2013.01); *G06F 2009/4557* (2013.01); *H04L 45/04* (2013.01); *H04L 45/302* (2013.01); *H04L 47/10* (2013.01); *H04L 61/2061* (2013.01); *H04L 61/6022* (2013.01); *H04L 67/10* (2013.01); *H04W 28/02* (2013.01); *H04W 28/0284* (2013.01)

(58) Field of Classification Search
USPC .................................................. 709/220, 223
See application file for complete search history.

(56) References Cited

U.S. PATENT DOCUMENTS

| | | | |
|---|---|---|---|
| 2004/0081091 | A1 | 4/2004 | Widmer et al. |
| 2007/0280243 | A1 | 12/2007 | Wray et al. |
| 2008/0031149 | A1 | 2/2008 | Hughes et al. |
| 2008/0138067 | A1 | 6/2008 | Beshai |
| 2011/0044438 | A1* | 2/2011 | Wang ................ H04L 65/4015 379/93.02 |
| 2012/0087313 | A1 | 4/2012 | Yin et al. |
| 2013/0016612 | A1 | 1/2013 | Vasseur et al. |
| 2013/0044764 | A1* | 2/2013 | Casado ................ H04L 12/66 370/401 |
| 2013/0070654 | A1 | 3/2013 | Nishimura |
| 2013/0083701 | A1 | 4/2013 | Tomic et al. |
| 2013/0128786 | A1 | 5/2013 | Sultan et al. |
| 2013/0263125 | A1* | 10/2013 | Shamsee ............ G06F 9/45558 718/1 |
| 2013/0305311 | A1* | 11/2013 | Puttaswamy Naga ...................... H04L 63/20 726/1 |
| 2014/0105015 | A1 | 4/2014 | Hui et al. |
| 2014/0108722 | A1* | 4/2014 | Lipchuk ................ G06F 12/08 711/113 |
| 2014/0133302 | A1 | 5/2014 | Fu et al. |
| 2014/0320500 | A1 | 10/2014 | Fletcher et al. |
| 2015/0249565 | A1 | 9/2015 | Yamabe et al. |
| 2015/0281078 | A1* | 10/2015 | Luo ..................... H04L 67/2814 709/203 |
| 2016/0094364 | A1 | 3/2016 | Subramaniyam et al. |
| 2016/0349993 | A1 | 12/2016 | Udupi et al. |
| 2017/0093754 | A1* | 3/2017 | Zhang ................ H04L 12/4641 |
| 2017/0257309 | A1* | 9/2017 | Appanna ................ H04L 45/245 |
| 2018/0006935 | A1 | 1/2018 | Mutnuru et al. |
| 2018/0063077 | A1 | 3/2018 | Tumuluru |
| 2018/0063743 | A1 | 3/2018 | Tumuluru et al. |
| 2018/0069924 | A1 | 3/2018 | Tumuluru et al. |

* cited by examiner

LOW DOWNTIME SOFTWARE-DEFINED WIDE AREA NETWORK SERVICE UPGRADE

CROSS-REFERENCE TO RELATED APPLICATIONS

This application claims the benefit of U.S. Provisional Patent Application No. 62/380,993, filed Aug. 29, 2016, the entire contents of which are incorporated by reference herein.

This application is related to the patent applications entitled "High Throughput Layer 2 Extension Leveraging CPU Flow Affinity" (U.S. patent application Ser. No. 15/690,222), "Low Downtime Software-Defined Wide Area Network Service Upgrade" (U.S. patent application Ser. No. 15/690,230), "Stateful Connection Optimization Over Stretched Networks Using Specific Prefix Routes" (U.S. patent application Ser. No. 15/690,224), "Stateful Connection Optimization Over Stretched Networks Using Packet Introspection" (U.S. patent application Ser. No. 15/690, 231), "Stateful Connection Optimization Over Stretched Networks with Temporary Tromboning (U.S. patent application Ser. No. 15/690,235), which are assigned to the assignee of this application and filed on the same day as this application and which are herein incorporated by reference in their entireties.

BACKGROUND

Cloud architectures are used in cloud computing and cloud storage systems for offering infrastructure-as-a-service (IaaS) cloud services. Examples of cloud architectures include the VMware vCloud™ Director cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

With an increasing trend in migrating data centers to cloud platforms, a hybrid model has been developed that combines public cloud services and traditional on-premise data center computing resources. Such hybrid cloud computing systems permit workloads, such as VMs, to be rapidly moved from the data center to the cloud, among other things.

SUMMARY

One embodiment disclosed herein provides a computer-implemented method of upgrading appliances in a computing system which includes a first computing system and a second computing system. The method generally includes deploying a first upgraded appliance in the first computing system and a second upgraded appliance in the second computing system, and configuring the first upgraded appliance and the second upgraded appliance to have either the same or different internet protocol (IP) addresses as a first original appliance and a second original appliance in the first computing system and the second computing system, respectively. The method further includes disconnecting the first and the second original appliances from one or more first networks in the first computing system and one or more second networks in the second computing system, respectively, and connecting the first and the second upgraded appliances to the one or more first networks and the one or more second networks, respectively. In addition, the method includes establishing one or more tunnels between the first and the second upgraded appliances.

Further embodiments provide a non-transitory computer-readable medium that includes instructions that, when executed, enable a computer to implement one or more aspects of the above method, and a computer system programmed to implement one or more aspects of the above method.

DETAILED DESCRIPTION

Embodiments disclosed herein provide techniques for upgrading virtual appliances in a hybrid cloud computing system. The upgraded virtual appliances may generally be different versions of the same type of virtual appliances, or different types of virtual appliances altogether than the original virtual appliances that the upgraded virtual appliances replace. In one embodiment, virtual appliances are upgraded by deploying the upgraded appliances in both a data center and a cloud, configuring the upgraded appliances to have the same IP addresses as the original appliances, and disconnecting the original appliances from networks to which they are connected and connecting the upgraded appliances to those networks via the same ports previously used by the original appliances. In another embodiment, upgraded appliances are deployed in both the data center and the cloud, but configured with new IP addresses that are different from those of the original appliances, and connections are switched from those of the original appliances to new connections with the new IP addresses. The embodiments disclosed herein permit virtual appliances to be upgraded or replaced with relatively little downtime so as to help minimize disruptions to existing traffic flows (e.g., restarting such traffic flows).

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

System Overview

Figure 1:
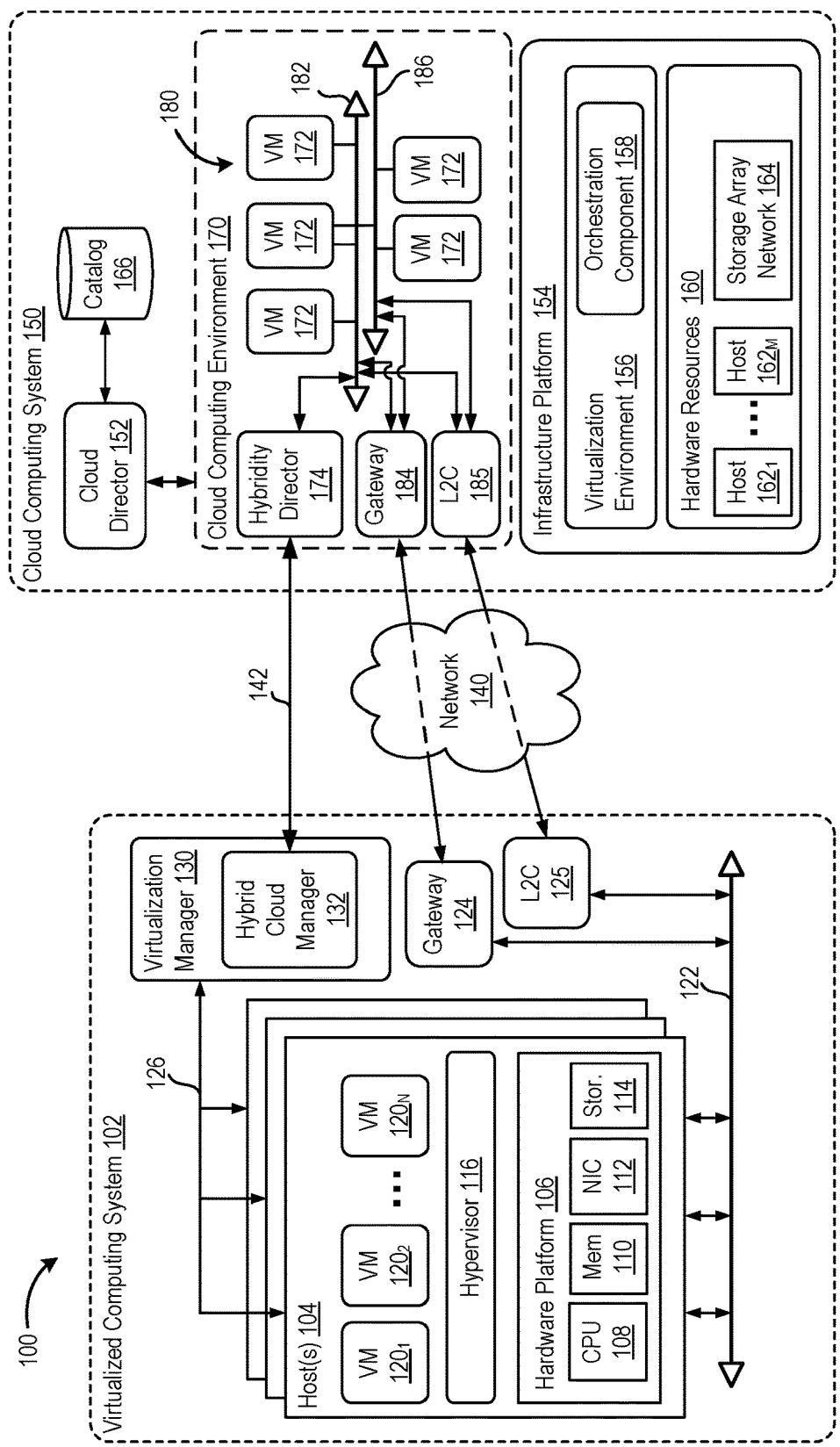
FIG. 1 is a block diagram of a hybrid cloud computing system in which one or more embodiments of the present disclosure may be utilized.

FIG. 1 is a block of a hybrid cloud computing system 100 in which one or more embodiments of the present disclosure may be utilized. Hybrid cloud diagram computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service providing cloud services to various organizations within the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 112S within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104. In addition, hypervisor 116 may provide a virtual switch (not shown), which is a software-based switch acting as a layer 2 (L2) forwarding engine and may be capable of performing virtual local area network (VLAN) tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts 162$_1$ to 162$_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link between virtualized computing system 102 and cloud computing system 150. Illustratively, layer 2 concentrators (L2C) 125 and 185 are parallel to gateways 124 and 184 and configured to provide a "stretched" L2 network that spans virtualized computing system 102 and cloud computing system 150, as described in greater detail below. In one embodiment, stretched network 145 may be separate from network 140 used by gateways 124 and 184 so that, e.g., VM migration traffic over network 140 does not create latency in stretched network 145.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director (e.g., executing as a virtual machine) may communicate with hybrid cloud manager 132 using Internet-based traffic via a VPN tunnel established between gateways 124 and 184, or alternatively, using direct connect 142.

Creating Layer 2 Extension Networks

One embodiment permits L2 extension networks to be created by deploying, configuring, and connecting virtual appliances in a data center and in a cloud so that the appliances communicate via secure tunnels and bridge networks that are in the data center and in the cloud. As described, an L2 extension network, or "stretched network," is a network spanning both a data center and the cloud in a hybrid cloud computing system, and stretched networks may permit, among other things, seamless workload migration by allowing endpoint network configurations and network in the data center to be kept when workloads are migrated to the cloud.

Figure 2:
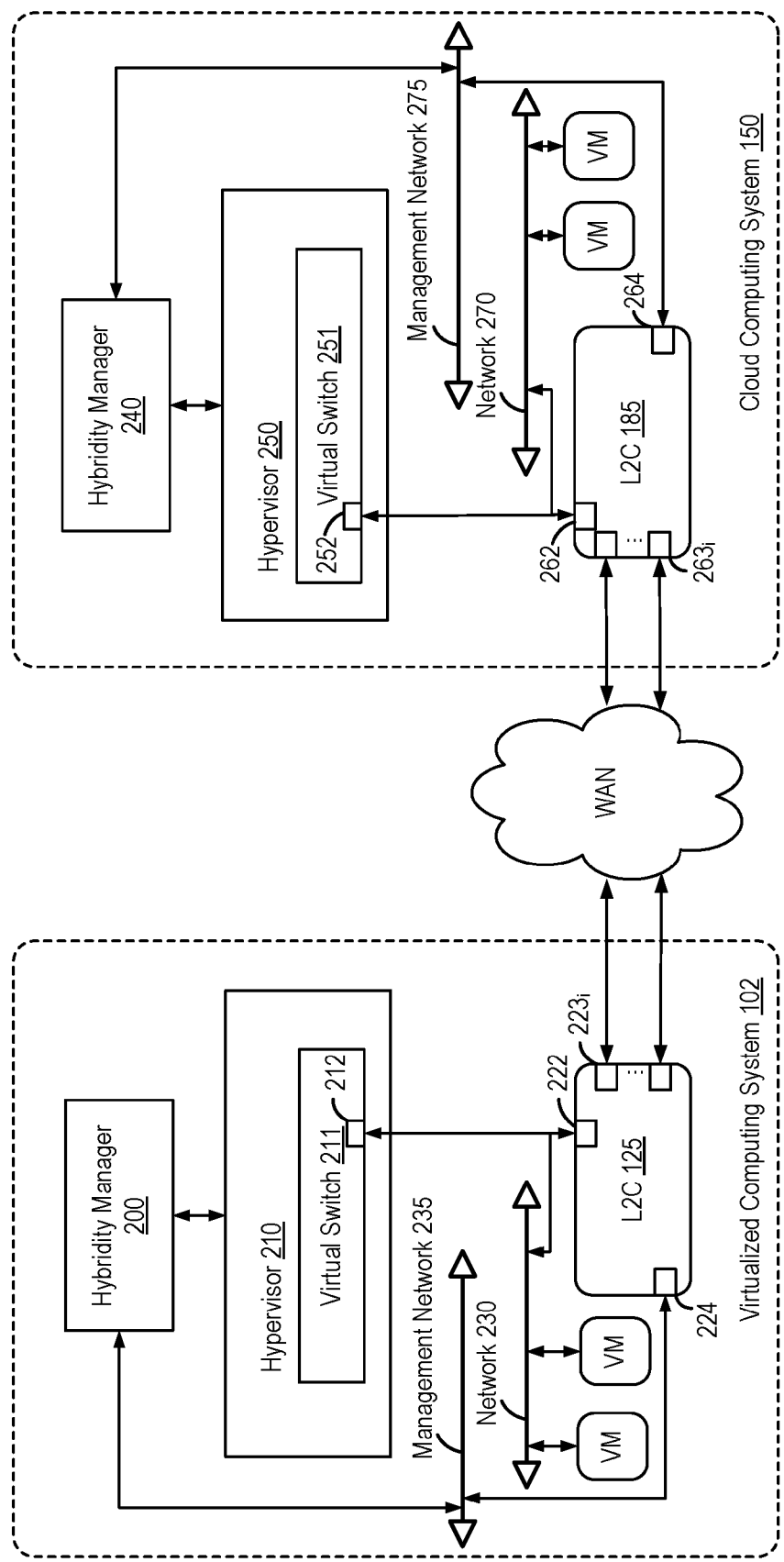
FIG. 2 illustrates components of hybrid cloud computing system used to create a stretched network, according to an embodiment.

FIG. 2 illustrates components of hybrid cloud computing system 100 used to create a stretched network, according to an embodiment. As shown, L2 concentrators 125 and 185 are virtual appliances deployed in virtualized computing system 102 and cloud computing system 150, respectively. As used herein, a "virtual appliance" refers to a VM image with a pre-configured software application, such as an application that performs the functions of an L2 concentrator. L2 concentrator appliances 125 and 185 are owned by hybridity manager 200 (which may correspond to, e.g., hybrid cloud manager 132) and hybridity manager 240 (which may correspond to, e.g., hybridity director 174), respectively. Hybridity managers 200 and 240 are registered with each other and tethered together, and have the ability to perform tasks requested by the other so that hybrid tasks can be executed together During the execution of hybrid tasks, jobs may be passed via a message bus between hybridity manager 200 and hybridity manager 240, with each job including a set of tasks to be performed to accomplish a focused goal or set of goals, as described in U.S. patent application Ser. No. 14/839,180 entitled Hybrid Task Framework and filed on Aug. 28, 2015, which is incorporated by reference herein in its entirety. Hybridity managers 200 and 240 may execute different tasks responsive to such jobs passed between them. For example, jobs may be used to share digital certificates, trigger local and remote virtual appliance deployments, persist deployment configurations, and the like.

As discussed in greater detail below, in order to create a stretched network, a pair of virtual appliances, such as L2 concentrator appliances 125 and 185, are first deployed in virtualized computing system 105 and in cloud computing system 150, respectively. IPsec tunnels with GRE tunnels therein or another WAN encapsulation overlay are created between the pair of virtual appliances for passing traffic securely between them, thereby providing a secure data plane on which a network may be stretched and VMs migrated. Although IPsec is used herein as an example of a protocol suite for securing IP communications by authenticating and encrypting IP packets and GRE is used herein as an example of a tunneling protocol that is able to encapsulate network layer protocols inside virtual point-to-point links over an IP network, it should be understood that other types of tunneling protocols/encapsulation and encrypted link(s) may be used in alternative embodiments. After the pair of virtual appliances are deployed and the IPsec tunnels established, a stretched network is created by (1) connecting a virtual interface card (VNIC) in each of the virtual appliances to a respective network that is local to virtual computing system 105 or cloud computing system 150, (2) configuring the virtual switch ports to which the virtual appliances are connected as sink ports that traffic from the VMs on the respective local network and having non-local destinations are redirected to, and (3) configuring each of the virtual appliances to bridge their VNIC connected to a local network and the GRE tunnels, i.e., to bridge local area network (LAN) and wide area network (WAN) links.

As shown, L2 concentrators 125 and 185 include VNICs 222-224 and 262-264, respectively. VNICs 222-224 and 262-264 are software-based virtual network adapters that may be logically connected to one or more physical network adapters (PNICs) via virtual switches 211 and 251 provided by hypervisors 210 and 250, respectively. In one embodiment, virtual switches 211 and 251 may be distributed virtual switches or components thereof, where a distributed virtual switch is a type of virtual switch that extends ports and management across host computers. In one embodiment, L2 concentrators 125 and 185 each include one VNIC that is a management interface, which is shown as VNICs 224 and 264 that are connected to management networks 235 and 275 and in communication with hybridity managers 200 or 240, respectively. L2 concentrators 125 and 185 further include one or multiple (e.g., 8) VNICs that are uplink interfaces that provide traffic paths through the hypervisor's physical connectivity layer (PNICs) and that IPsec tunnel traffic passes through, which are shown as VNICs $223_i$ and $263_i$, respectively. In addition, L2 concentrators 125 and 185 each include one VNIC, shown as VNICs 222 and 262, which is a bridge interface that is connected to a network 230 and 270 that is local to virtualized computing system 102 and cloud computing system 150, respectively. Although one bridging interface is shown in each of L2 concentrators 125 and 185, meaning that one stretched network can be created using L2 concentrators 125 and 185, it should be understood that any number of bridging interfaces may be employed in other embodiments.

To create a stretched network, hybridity manager 200 configures L2 concentrator 125 to enable bridging, with one leg of the bridge being VNIC 222 that is connected to the local network 230 and another leg of the bridge being the GRE tunnel(s) going through IPsec tunnel(s) and VNICs $223_i$. Hybridity manager 200 further configures L2 concentrator 125 with details of the local (self) and remote L2 concentrator 185 peer IP addresses, which may be derived from, e.g., an internal IP address pool. For example, if the internal IP address pool is the 192.0.02 series of IP addresses, the following pairs of IP addresses may be used: 192.0.02.3/192.0.2.19, 192.0.2.4/192.0.2.20, etc. Hybridity manager 185 in cloud computing center 150 may configure L2 concentrator 185 to enable bridging and with details of local and remote peer IP addresses in a similar manner. Bridging is then configured and enabled.

In one embodiment, which is discussed in greater detail below, hybridity manager 200 first reserves bridge VNIC 222 and then connects VNIC 222 to network 230, such as by connecting VNIC 222 to a particular port group, where VMs connected to that port group belong to network 230 (e.g., a VLAN). Further, hybridity manager 200 configures the port 212 to which VNIC 222 is connected as a sink port to which virtual switch 211 is configured to redirect packets with non-local destinations. It should be understood that virtual switch 211 will typically not send flooded traffic which is not meant for the media access control (MAC) address of VNIC 222 to VNIC 222, but this optimization can be eliminated by enabling the port to which VNIC 222 is connected as a sink port so that the port is treated as an uplink port that receives flooded traffic. As a result, sink port 212 to which L2 concentrator 125 is connected will receive all packets with non-local destinations (which are redirect to sink port 212 by the virtual switch). L2 concentrator 125 is further configured to bridge VNIC 222 and GRE tunnels going through VNICs $223_i$ such that L2 concentrator forwards packets with non-local destinations received via VNIC 222 to L2 concentrator 185 via VNICs $223_i$, over the GRE and IPsec tunnels between L2 concentrators 125 and 185. L2 concentrator 185 is connected to network 270 and may inject the traffic it receives from L2 concentrator 125 on to network 270 so that the traffic is ultimately routed to a destination in cloud computing system 150. This process essentially gives the illusion that there is nothing between network 230 in virtualized computing system 102 and network 270 in cloud computing system 150, i.e., that networks 230 and 270 together form a stretched network spanning virtualized computing system 102 and cloud computing system 150. After VNIC 222 is connected to the network being stretched and sink port settings and bridging are configured, hybridity manager 200 then enables the VNIC 222 inside a guest OS. In one embodiment, the connection and sink port configurations may be persisted so that L2 concentrator 125 can later be redeployed (e.g., if L2 concentrator 125 fails) and reconfigured to connect VNIC 222 and configure it as a sink port.

Hybridity manager 240 on cloud computing system 150 side may perform similar actions as those performed by hybridity manager 200, including reserving a VNIC 262 corresponding to VNIC 222 reserved in virtualized computing system 102, where the same VNIC index may be used on both sides for a given bridge; connecting VNIC 262 to a network (e.g., a virtual wire) backing a cloud network 270; configuring the port 252 to which VNIC 262 is connected as a sink port to which traffic with non-local destination is redirected so that L2 concentrator 185 may securely send such traffic to L2 concentrator 125 over the IPsec tunnel between these appliances; persisting the connection and sink port configurations; and enabling VNIC 262 in a guest OS. Further, the stretched network may be unstretched by reversing the operations discussed above in both virtualized computing system 102 and cloud computing system 150.

Figure 3:
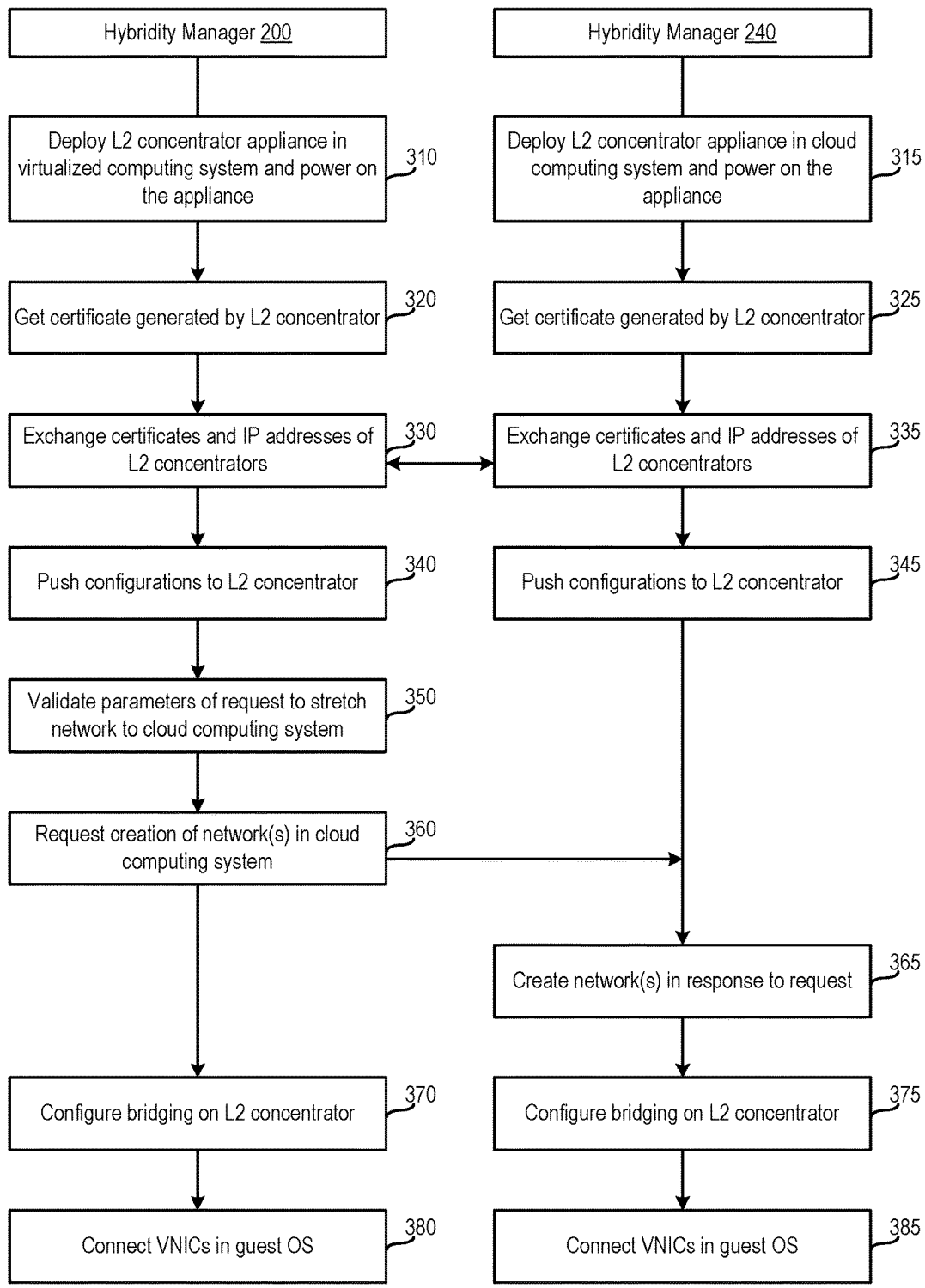
FIG. 3 illustrates a method of creating a stretched network, according to an embodiment.

FIG. 3 illustrates a method 300 of creating an L2 extension network in a hybrid cloud computing system, according to an embodiment. In one embodiment, method 300 may employ the hybrid task framework described above to pass jobs between hybridity manager 200 and hybridity manager 240 and execute those jobs for performing one or more of the steps of method 300.

As shown, method 300 begins at step 310, where hybridity manager 200 deploys L2 concentrator appliance 125 in virtualized computing system 102 and powers on the deployed appliance 125. In one embodiment, L2 concentrator appliance 125 may include a GRE L2 concentrator application therein. As described, one or more (e.g., 8) VNICs 223$_i$ of L2 concentrator appliance 125 may be uplink interfaces connected to an uplink network (e.g., an uplink port group) and have distinct IP addresses from, e.g., a user-provided range or list of IP address. Another VNIC 224 of L2 concentrator appliance 125 may be connected to a management network to communicate with hybridity manager 200. Yet another VNIC 222 may be configured as a bridge VNIC that is not initially connected to any port, or connected to a "none" port.

At step 315, hybridity manager 240 deploys a mirror L2 concentrator appliance 185 in cloud computing system 150 and powers on the deployed appliance 185. Similar to L2 concentrator appliance 125, L2 concentrator appliance 185 may include one or more VNICs 263$_i$ connected to external network(s), a VNIC 264 connected to a management network for communicating with hybridity manager 240, and a bridge VNIC 262 that is initially not connected to any port or connected to a "none" port. If there are multiple external networks (e.g., multiple Direct Connect networks), then an equal number of VNICs 263$_i$ may be connected to each of the external networks in one embodiment. Further, the number of VNICs of L2 concentrator appliance 185 that are connected to the uplink network in virtual computing system 102 may either be the same as, or different from, the number of VNICs of L2 concentrator appliance 125 that are connected to external networks. That is, there may generally be a mesh n: (n*m), where n is the number of uplinks on the virtual computing system 102 side and m is the number/types of external networks on the cloud computing system 150 side.

At steps 320 and 325, hybridity managers 200 and 240 receive certificates from, and establish secure communications sessions with, L2 concentrators 125 and 185, respectively. In one embodiment, after L2 concentrators 125 and 185 are powered on, L2 concentrators 125 and 185 obtain digital certificates for establishing encrypted communications links and send such certificates to hybridity managers 200 and 240, respectively. For example, certificates may be generated and used to establish Secure Sockets Layer (SSL) sessions between L2 concentrators 125 and 185 and hybridity managers 200 and 240, respectively. The certificates may be machine to machine generated and exchanged via hybridity managers 200 and 240. In such a case, the certificate authority can be configured in hybridity managers as needed which will generate certificates from there.

At steps 330 and 335, hybridity managers 200 and 240 exchange certificates for configuring secure tunnels between L2 concentrators 125 and 185 and the IP addresses of L2 concentrators 125 and 185. As described, the secure tunnels may be IPsec tunnels in one embodiment, and, in such a case, certificates may be exchanged to enable Internet Key Exchange (IKE) handshakes for establishing the IPsec tunnels. The certificates themselves may first be obtained by hybridity managers 200 and 240 from, e.g., a certificate authority. Although described herein primarily with respect to certificates, it should be understood that, in alternative embodiments, secure communication tunnels may be established in other ways. For example, IPsec authentication can use pre-shared keys in lieu of digital certificates. It should be understood that hybridity managers 200 and 240 may wait for the certificate exchange at steps 330 and 335 to finish before proceeding further, i.e., at this point the parallel workflows on hybridity managers 200 and 240 may be synchronized. This is because the exchanged certificates are required to create the secure tunnels between L2 concentrators 125 and 185.

At step 340 and 345, hybridity managers 200 and 240 push configurations for establishing secure tunnels to L2 concentrator 125 and L2 concentrator 185, respectively. In one embodiment, the pushed configurations may include details of the local (self) and remote L2 concentrator peer IP addresses, which may be derived from, e.g., an internal IP address pool, as well as number of available WAN uplinks (e.g., the secure tunnels may be configured to make use of all of the available WAN links) and implicit routing. Secure tunnels (e.g., IPsec tunnels) are then created by L2 concentrators 125 185 using the configurations pushed to them at steps 340 and 345.

At step 350, hybridity manager 200 validates parameters of a request to stretch a network to cloud computing system 150. Such parameters may be validated to ensure, e.g., that network(s) specified by a user actually exist in the cloud computing system 150 for the stretched network to attach to. For example, a request to stretch a network may specify a network in cloud computing system 150 with a given gateway and subnet mask, and hybridity management 200 may (e.g., in conjunction with hybridity manager 240) determine whether such a network exists.

At step 360, hybridity manager 200 makes a remote call to request that hybridity manager 240 create network(s) in cloud computing system 150 to which an existing network in virtual computing system 102 may be bridged to create a stretched network. This assumes that, at step 350, it is determined that no such network(s) exist in cloud computing system 150. In turn, hybridity manager 240 creates the network(s) in cloud computing system 150 at step 365. The network(s) that are created may include, e.g., a network that is optimized such that traffic flows between VMs in cloud computing system 150 are routed within cloud computing system 150 without being sent back to virtualized computing system 102, or a combination of such an optimized network and an unoptimized network on which traffic flows may trombone back to a default gateway in virtualized computing system 102, which are described in detail in the patent applications entitled patent applications entitled "Stateful Connection Optimization Over Stretched Networks Using Specific Prefix Routes" (U.S. patent application Ser. No. 15/690,224), "Stateful Connection Optimization Over Stretched Networks Using Packet Introspection" (U.S. patent application Ser. No. 15/690,231), and "Stateful Connection Optimization Over Stretched Networks with Temporary Tromboning (U.S. patent application Ser. No. 15/690,235).

At steps 370 and 375, hybridity managers 200 and 240 configure bridging on L2 concentrators 125 and 185, respectively. In one embodiment, the configuring performed by hybridity manager 200 includes reserving bridge VNIC 222 of L2 concentrator 125 and connecting bridge VNIC 222 to network 230 (e.g., by connecting VNIC 222 to the corresponding port group) being stretched. Further, hybridity manager 200 configures virtual switch port 212 to which bridge VNIC 222 is connected as a sink port. As a result, the virtual switch redirects packets with non-local destinations to sink port 212, and L2 concentrator 125 is further configured to bridge so that packets received via sink port 212 are securely sent, via VNICs $223_i$, to L2 concentrator 185 connected to network 270 connected to uplink networks and over the IPsec tunnel between L2 concentrators 125 and 185, to the L2 concentrator 185 connected to network 270. That is, the sink port absorbs traffic with non-local destinations, and then L2 concentrator 125 moves along such traffic based on its destination to one of the networks on the system (bridges or uplinks). It should be understood that virtual switches learn local IP addresses, and virtual switch 211 may thus identify non-local destinations as those IP addresses that have not been learned as local IP addresses, and redirect packets with such non-local destinations to sink port 212.

Hybridity manager 240 in cloud computing system 150 may perform similar steps to configure bridging on L2 concentrator 185, including reserving a VNIC 262 corresponding to VNIC 222 reserved in virtualized computing system 102, connecting VNIC 262 to a network (e.g., a virtual wire) backing a cloud network 270; configuring the virtual switch port to which VNIC 262 is connected as a sink port to which traffic with non-local destinations is redirected, and configuring L2 concentrator 185 to establish a bridge between the WAN and local network links, namely the GRE tunnels and VNIC 222. In one embodiment, the WAN link may be bridged to one local network link in the case of a network that has been optimized to eliminate tromboning, as described above. Alternatively, the WAN link may be bridged to two local network links corresponding to a route optimized and an unoptimized network. That is, the stretched network that is created includes one network in virtual computing system 102 and either one (a route optimized) or two (a route optimized and an unoptimized) networks in cloud computing system 150.

At steps 380 and 385, hybridity managers 200 and 240 enable VNICs in the guest OSes of L2 concentrators 125 and 185, respectively. That is, hybridity manager 200 and 400 set the in-guest interface state which is controlled for traffic engineering purposes within L2 concentrators 125 and 185. It should be understood that this is different from connecting a VNIC to a port group as described above, which permits the hypervisor to allow L2 concentrator 125 or 185 to connect to a network (physically) when the L2 concentrator 125 or 185 wants to switch a packet/bring the interface into an up state.

Low Downtime Software-Defined Wide Area Network Service Upgrades

One embodiment upgrades virtual appliances in a hybrid cloud computing system by deploying the upgraded appliances in both virtualized computing system 102 and cloud computing system 150, with either the same IP addresses as the original (pre-upgrade) appliances or new IP addresses, and then either disconnecting the original appliances and connecting the upgraded appliances or switching to new connections with the new IP addresses, respectively. As described, a virtual appliance is a VM image with a preconfigured software application, and virtual appliances may be deployed in virtualized computing system 102 and cloud computing system 150 and tethered together via IPsec tunnel(s) in one embodiment, creating secure data path components. Such tethered virtual appliances may communicate with each other and/or enable communications between other VMs via one or more active sessions, and embodiments disclosed herein permit the virtual appliances to be upgraded or replaced with relatively little downtime so as to help minimize disruptions to existing traffic flows (e.g., restarting such traffic flows).

Figure 4:
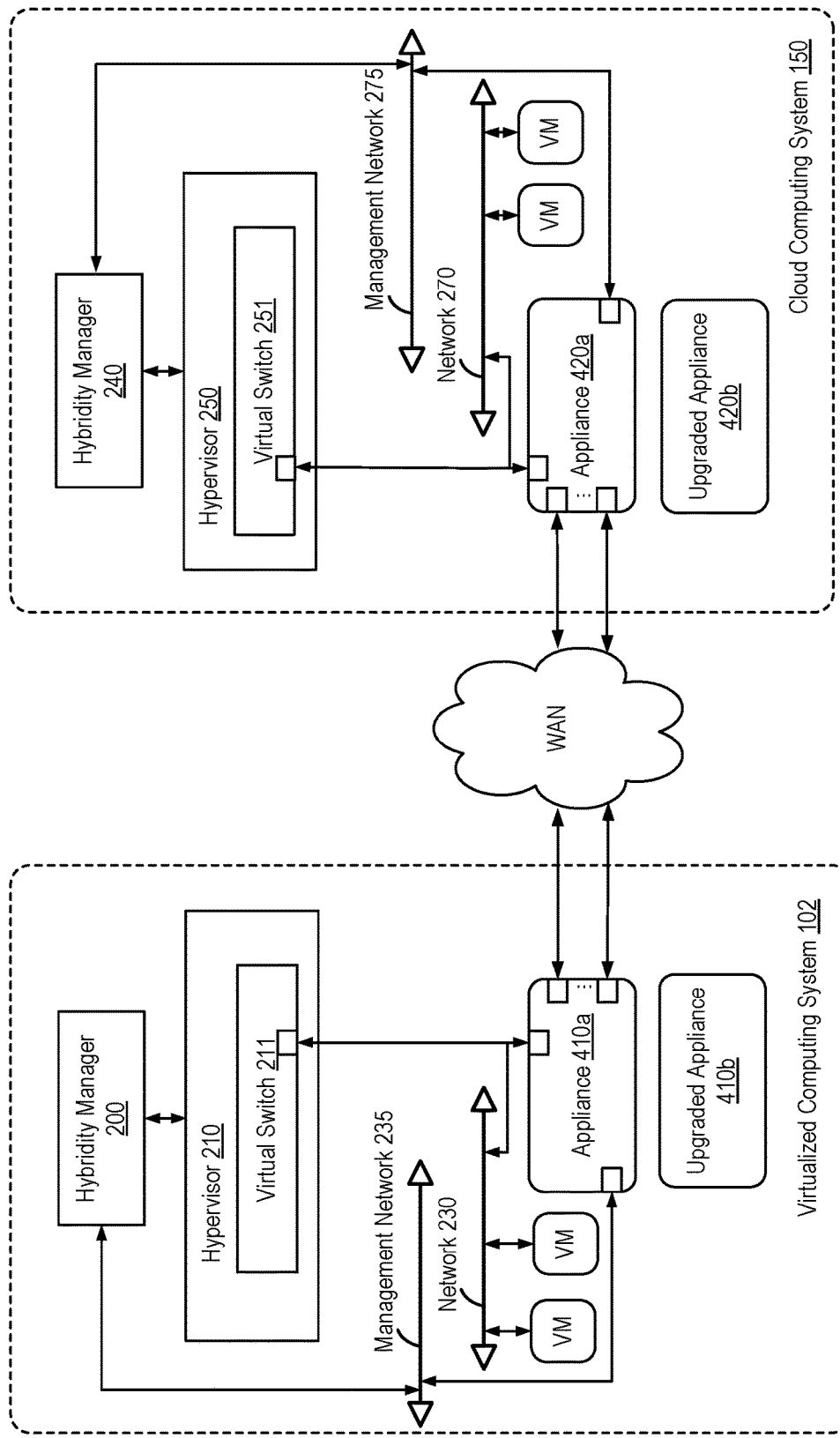
FIG. 4 illustrates an approach for upgrading appliances in a stretched network while attempting to minimize affects to existing traffic.

FIG. 4 illustrates an approach for upgrading virtual appliances in a stretched network while attempting to minimize disruptions to existing traffic. As shown, hybridity managers 200 and 240 power on and configure upgraded appliances 410b and 420b in virtualized computing system 102 and in cloud computing system 150, respectively, with certificates exchanges to establish secure communication links, similar to the discussion above with respect to FIGS. 2 and 3. Illustratively, the upgraded appliances 410b and 420b are shown as being upgraded L2 concentrator appliances (e.g., corresponding to L2 concentrators 125 and 185) that replace original L2 concentrator appliances 410a and 420a. However, it should be understood that the upgraded and original appliances may be other types of appliances in other embodiments. In one embodiment, upgraded appliances 410b and 420b are configured to have same the IP addresses as original appliances 410a and 420a. In such a case, upgraded appliances 410b and 420b should not be simultaneously connected to the same network(s) as original appliances 410a and 420a with which they share IP addresses.

The initial powering on of upgraded appliances 410b and 420b, exchange of certificates, and configuring of upgraded appliances 410b and 420b may occur in parallel and need not be synchronized. However, after both upgraded appliances 410b and 420b are configured and arrive at the same point, then hybridity managers 200 and 240 disconnect original appliances 410a and 420a in parallel and connect upgraded appliances 410b and 420b in their places. Original appliances 410a and 420a may be disconnected from one or multiple networks, such as the management network, uplink networks, and bridging interfaces described above with respect to L2 concentrators 125 and 185. In turn, hybridity manager 200 and 240 connects upgraded appliances 410*b* and 420*b* to those same networks. It should be understood that connecting upgraded appliances 410*b* and 420*b* to the same networks may include sending messages to NICs of the host computers in which appliances 410*b* and 420*b* run specifying that IP addresses belonging to original appliances 410*a* and 420*a*, which as described are shared by upgraded appliances 410*b* and 420*b*, will be available on new MAC address belonging to upgraded appliances 410*b* and 420*b*. That is, hybridity managers 200 and 240 may each send instructions to corresponding upgraded/original appliance VMs to bring up/down their VNICs, and further send messages host computers to allow/deny those connections. In one embodiment, the MAC addresses are the same for the old appliance to the new appliance, and the connectivity is restored during a last phase of the redeployment (when the VNICs are disconnected from the old appliance and connected up to the new appliance). Assuring they have the same MAC ensures traffic flows will resume when the system comes back up.

In addition to connecting upgraded appliances 410*b* and 420*b* to the appropriate networks, hybridity managers 200 and 240 may also create IPsec tunnel(s) for secure communications between upgraded appliances 410*b* and 420*b* using, e.g., the same configurations previously used to create IPsec tunnel(s) between original appliances 410*a* and 420*a*. Experience has shown that the foregoing steps of disconnecting the original appliances, connecting upgraded appliances, and creating IPsec tunnel(s) can take approximately 15 seconds, which is less than the 30 seconds that typical application-level protocols can tolerate of down-out. As a result, upgrades and security fixes such as those for L2 concentrators 125 and 185 may be quickly pushed out with relatively little disruptions to VMs on a stretched network and without bringing down the stretched network.

In an alternative embodiment, upgraded appliances 410*b* and 420*b* may be configured with different IP addresses than original appliances 410*a* and 420*a*. In such a case, upgraded appliances 410*b* and 420*b* may be simultaneously connected to the same networks as original appliances 410*a* and 420*a*, as the problem of multiple appliances sharing the same IP address does not exist. Then, IPsec tunnel(s) may be created between upgraded appliances 410*b* and 420*b*. After the IPsec tunnel(s) are created, hybridity managers 200 and 240 may switch connections from those of original appliances 410*a* and 420*a* to those of upgraded appliances 410*b* and 420*b*. In the case of L2 concentrator appliances, the switching of connections may include disconnecting original appliances 410*a* and 420*a* from sink ports and connecting upgraded appliances 410*b* and 420*b* to new sink ports, which is different from the approach described above in which new L2 concentrator appliances with the same IP addresses as original L2 concentrator appliance may be connected to existing sink ports that the original L2 concentrators were connected to. Experience has shown that configuring upgraded appliances with different IP addresses and switching connections may take approximately 2-3 seconds, which is also less than the 30 second that typical application-level protocols can tolerate of down-out. The drawback of using different IP addresses is that additional IP addresses need to be available for upgraded appliances 410*b* and 420*b*.

Figure 5:
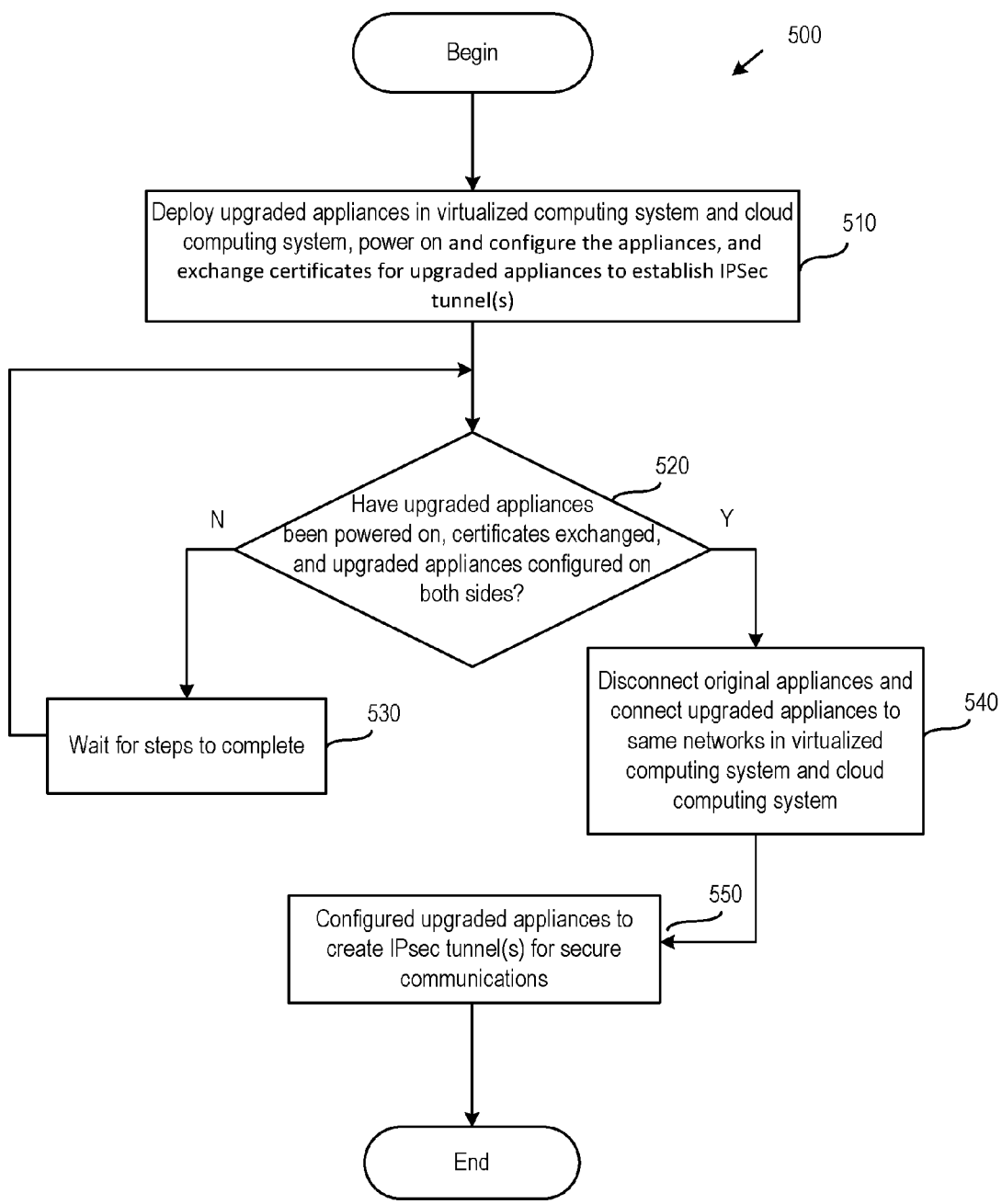
FIG. 5 illustrates a method of upgrading appliances in a stretched network, according to an embodiment.

FIG. 5 illustrates a method 500 of upgrading appliances in a stretched network, according to an embodiment. As shown, method 500 begins at step 510, where hybridity managers 200 and 240 deploy upgraded appliances 410*b* and 420*b* in virtualized computing system 102 and in cloud computing system 150, respectively, power on and configure the respective appliances 410*b* and 420*b*, and exchange certificates for upgraded appliances 410*b* and 420*b* to establish IPsec tunnel(s). In one embodiment, the upgraded appliances 410*b* and 420*b* that are deployed are configured with the same IP addresses as original appliances 410*a* and 420*a*. In another embodiment, managers 200 and 240 and upgraded appliances 410*b* and 420 may also exchange certificates and establish secure communication links (e.g., SSL sessions) between managers 200 and 240 and appliances 410*b* and 420, respectively. It should be understood that step 510 is similar to the beginning of the workflow for creating stretched networks described above with respect to FIGS. 2-3.

At step 520, hybridity managers 200 and 240 determine if upgraded appliances 410*b* and 420*b* have both been powered on, certificates for creating IPsec tunnel(s) have been exchanged, and upgraded appliances 410*b* and 420*b* have been configured. As described, these steps may be performed in parallel in computing system 102 and cloud computing system 150, and hybridity managers 200 and 240 may wait for both upgraded appliances 410*b* and 420*b* to arrive at the same point in time before continuing the upgrade process.

If upgraded appliances 410*b* and 420*b* have not both been powered on, certificates for establishing IPsec tunnel(s) have not been exchanged, or upgraded appliances 410*b* and 420*b* have not been configured, then at step 530, hybridity managers 200 and 240 continue waiting. If, on the other hand, upgraded appliances 410*b* and 420*b* have both been powered on, certificates for establishing IPsec tunnel(s) have been exchanged, and upgraded appliances 410*b* and 420*b* have been configured, then at step 540, hybridity managers 200 and 240 disconnect original appliances 410*a* and 420*a* and connect upgraded appliances 410*b* and 420*b* to the same networks that original appliances 410*a* and 420*a* were connected to in virtualized computing system 102 and in cloud computing system 150, respectively.

Then, at step 550, hybridity managers 200 and 240 configure upgraded appliances 410*b* and 420*b* to create IPsec tunnel(s) for secure communications between upgraded appliances 410*b* and 420*b*. It should be understood that such IPsec tunnel(s) may be created in a similar manner as that described above with respect to steps 345 and 350 of method 300.

Figure 6:
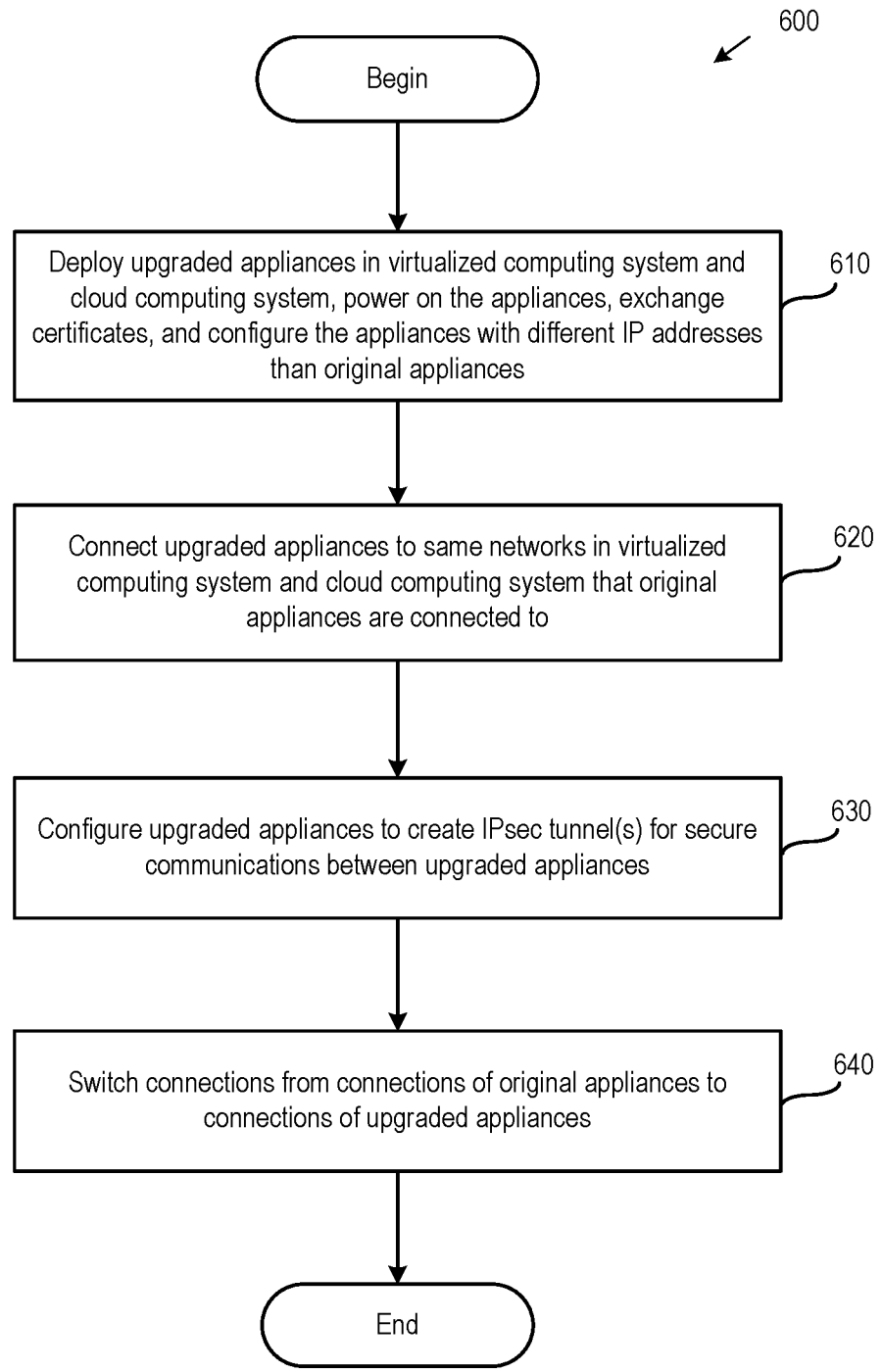
FIG. 6 illustrates an alternative method of upgrading appliances in a stretched network, according to an embodiment.

FIG. 6 illustrates an alternative method 600 of upgrading appliances in a stretched network, according to an embodiment. As shown, method 600 begins at step 610, where hybridity managers 200 and 240 power on upgraded appliances 410*b* and 420*b* in virtualized computing system 102 and in cloud computing system 150, respectively, exchange certificates for appliances 410*b* and 420*b* to establish IPsec tunnel(s), and configure the respective appliances 410*b* and 420*b* with different IP addresses than original appliances 410*a* and 420*a*. It should be understood that step 610 is similar to step 510 of method 500 described above, except that upgraded appliances 410*b* and 420*b* are configured to have different IP addresses than original appliances 410*a* and 420*a*. In one embodiment, managers 200 and 240 and upgraded appliances 410*b* and 420 may also exchange certificates and establish secure communication links (e.g., SSL sessions) between managers 200 and 240 and appliances 410*b* and 420, respectively.

At step 620, hybridity managers 200 and 240 connect upgraded appliances 410*b* and 420*b* to the same networks that original appliances 410*a* and 420*a* are connected to in virtualized computing system 102 and in cloud computing system 150, respectively. At step 630, Hybridity managers 200 and 240 further configure upgraded appliances 410*b* and 420*b* to create IPsec tunnel(s) for secure communications between upgraded appliances 410*b* and 420*b*. Then, at step 640, hybridity managers 200 and 240 switch connections from those of original appliances 410*a* and 420*a* to those of upgraded appliances 410*b* and 420*b*. For example, the switching of connections for appliances that are L2 concentrators may include disconnecting original appliances 410*a* and 420*a* from sink ports and connecting upgraded appliances 410*b* and 420*b* to new sink ports. It should be understood that this approach differs from the case in which new L2 concentrator appliances are configured with the same IP addresses as original L2 concentrator appliance and the new L2 concentrators can then be connected to the same sink ports that the original L2 concentrators were connected to.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method of upgrading appliances in a computing system which includes a first computing system and a second computing system, the method comprising:
   deploying a first upgraded appliance in the first computing system and a second upgraded appliance in the second computing system;
   configuring the first upgraded appliance and the second upgraded appliance to have either the same or different internet protocol (IP) addresses as a first original appliance and a second original appliance in the first computing system and the second computing system, respectively;
   disconnecting the first and the second original appliances from one or more first networks in the first computing system and one or more second networks in the second computing system, respectively;
   connecting each of the first and the second upgraded appliances to the one or more first networks and the one or more second networks, respectively; and
   establishing one or more tunnels between the first and the second upgraded appliances.

2. The method of claim 1, wherein:
   the first upgraded appliance and the second upgraded appliance are configured to have the same internet protocol (IP) addresses as the first original appliance and the second original appliance, respectively; and
   the first and the second upgraded appliances are connected to the same one or more networks using the same ports as the first original appliance and the second original appliance used prior to the disconnecting of the first and second original appliances, respectively.

3. The method of claim 1, further comprising:
   notifying network interface cards (NICs) of host computers in which the first and the second upgraded appliances run that the IP addresses are available on Media Access Control (MAC) addresses belonging to the upgraded first and second appliances.

4. The method of claim 1, wherein:
   the first upgraded appliance and the second upgraded appliance are configured to have different internet protocol (IP) addresses from the first original appliance and the second original appliance, respectively; and
   the first and the second upgraded appliances are connected to the same one or more networks by switching connections from connections of the first and the second original appliances to connections of the first and the second upgraded appliances in the first computing system and in the second computing system, respectively.

5. The method of claim 4, wherein:
   the first and second appliances are virtual machines with layer 2 (L2) concentrator applications running therein; and
   switching the connections from the connections of the first and the second original appliances to the connections of the first and the second upgraded appliances includes disconnecting the first and the second original appliances from sink ports and connecting the first and the second upgraded appliances to other sink ports.

6. The method of claim 4, wherein the first and the second upgraded appliances are connected to the one or more first networks and the one or more second networks, respectively, prior to the disconnecting of the first and the second original appliances from the one or more first networks and the one or more second networks, respectively.

7. The method of claim 1, wherein:
   the steps of deploying the first upgraded appliance, configuring the first upgraded appliance, disconnecting the first original appliance, and connecting the first upgraded appliance are performed by a first management application;
   the steps of deploying the second upgraded appliance, configuring the second upgraded appliance, disconnecting the second original appliance, and connecting the second upgraded appliance are performed by a second management application; and
   the first and second management applications are configured to perform jobs requested by each other so as to execute one or more tasks jointly.

8. The method of claim 7, wherein:
   the one or more tunnels include Generic Routing Encapsulation (GRE) tunnels going through Internet Protocol Security (IPsec) tunnels; and
   the IPsec tunnels are established between the first and the second upgraded appliances by performing steps including:
      exchanging digital certificates between the first and second management applications,
      transmitting received digital certificates from the first and second management applications to the first and the second upgraded appliances, respectively, and
      creating, by the first and second upgraded appliances, the IPsec tunnels using the transmitted digital certificates.

9. The method of claim 1, wherein the first computing system is a private virtualized computing system and the second computing system is a cloud computing system.

10. The method of claim 1, wherein the first and second appliances are virtual appliances.

11. A non-transitory computer-readable medium comprising instructions executable by a computer, the computer having one or more physical central processing units (CPUs), wherein the instructions, when executed, cause the computer to perform operations for upgrading appliances in a computing system which includes a first computing system and a second computing system, the operations comprising:
   deploying a first upgraded appliance in the first computing system and a second upgraded appliance in the second computing system;
   configuring the first upgraded appliance and the second upgraded appliance to have either the same or different internet protocol (IP) addresses as a first original appliance and a second original appliance in the first computing system and the second computing system, respectively;
   disconnecting the first and the second original appliances from one or more first networks in the first computing system and one or more second networks in the second computing system, respectively;
   connecting the first and the second upgraded appliances to the one or more first networks and the one or more second networks, respectively; and establishing one or more tunnels between the first and the second upgraded appliances.

12. The computer-readable medium of claim 11, wherein:
the first upgraded appliance and the second upgraded appliance are configured to have the same internet protocol (IP) addresses as the first original appliance and the second original appliance, respectively; and
the first and the second upgraded appliances are connected to the same one or more networks using the same ports as the first original appliance and the second original appliance used prior to the disconnecting of the first and second original appliances, respectively.

13. The computer-readable medium of claim 11, the operations further comprising:
notifying network interface cards (NICs) of host computers in which the first and the second upgraded appliances run that the IP addresses are available on Media Access Control (MAC) addresses belonging to the upgraded first and second appliances.

14. The computer-readable medium of claim 11, wherein:
the first upgraded appliance and the second upgraded appliance are configured to have different internet protocol (IP) addresses from the first original appliance and the second original appliance, respectively; and
the first and the second upgraded appliances are connected to the same one or more networks by switching connections from connections of the first and the second original appliances to connections of the first and the second upgraded appliances in the first computing system and in the second computing system, respectively.

15. The computer-readable medium of claim 14, wherein:
the first and second appliances are virtual machines with layer 2 (L2) concentrator applications running therein; and
switching the connections from the connections of the first and the second original appliances to the connections of the first and the second upgraded appliances includes disconnecting the first and the second original appliances from sink ports and connecting the first and the second upgraded appliances to other sink ports.

16. The computer-readable medium of claim 14, wherein the first and the second upgraded appliances are connected to the one or more first networks and the one or more second networks, respectively, prior to the disconnecting of the first and the second original appliances from the one or more first networks and the one or more second networks, respectively.

17. The computer-readable medium of claim 11, wherein:
the steps of deploying the first upgraded appliance, configuring the first upgraded appliance, disconnecting the first original appliance, and connecting the first upgraded appliance are performed by a first management application;

the steps of deploying the second upgraded appliance, configuring the second upgraded appliance, disconnecting the second original appliance, and connecting the second upgraded appliance are performed by a second management application; and
the first and second management applications are configured to perform jobs requested by each other so as to execute one or more tasks jointly.

18. The computer-readable medium of claim 17, wherein:
the one or more tunnels include Generic Routing Encapsulation (GRE) tunnels going through Internet Protocol Security (IPsec) tunnels; and
the IPsec tunnels are established between the first and the second upgraded appliances by performing steps including:
exchanging digital certificates between the first and second management applications,
transmitting received digital certificates from the first and second management applications to the first and the second upgraded appliances, respectively, and
creating, by the first and second upgraded appliances, the IPsec tunnels using the transmitted digital certificates.

19. The computer-readable medium of claim 11, wherein:
the first computing system is a private virtualized computing system and the second computing system is a cloud computing system; and
the first and second appliances are virtual appliances.

20. A system, comprising:
a processor; and
a memory, wherein the memory includes a program configured to perform operations for upgrading appliances in a computing system which includes a first computing system and a second computing system, the operations comprising:
deploying a first upgraded appliance in the first computing system and a second upgraded appliance in the second computing system,
configuring the first upgraded appliance and the second upgraded appliance to have either the same or different internet protocol (IP) addresses as a first original appliance and a second original appliance in the first computing system and the second computing system, respectively,
disconnecting the first and the second original appliances from one or more first networks in the first computing system and one or more second networks in the second computing system, respectively,
connecting the first and the second upgraded appliances to the one or more first networks and the one or more second networks, respectively, and
establishing one or more tunnels between the first and the second upgraded appliances.

* * * * *